United States Patent [19]
Price

[11] Patent Number: 4,457,198
[45] Date of Patent: Jul. 3, 1984

[54] APPARATUS FOR CUTTING LENGTHS OF LUMBER INTO BLOCKS

[76] Inventor: Larry L. Price, Rte. 2, Van Buren, Mo. 63965

[21] Appl. No.: 348,348

[22] Filed: Feb. 12, 1982

[51] Int. Cl.³ .............................................. B26D 7/06
[52] U.S. Cl. ................................................. 83/411 A
[58] Field of Search ..................... 83/391, 401, 411 A, 83/490, 597, 602

[56] References Cited

U.S. PATENT DOCUMENTS

| 1,212,507 | 1/1917 | Koontz | 83/411 A |
| 1,653,257 | 12/1927 | Davis | 83/411 A |
| 3,291,168 | 12/1966 | Zitner | 143/57 |
| 3,888,151 | 6/1975 | Beckerer et al. | 83/411 A |
| 4,031,788 | 6/1977 | Boge et al. | 83/411 A |
| 4,050,339 | 9/1977 | Soleri | 83/411 A |

FOREIGN PATENT DOCUMENTS

| 531748 | 10/1976 | U.S.S.R. | 83/411 A |
| 564957 | 8/1977 | U.S.S.R. | 83/411 A |
| 621503 | 7/1978 | U.S.S.R. | 83/411 A |

Primary Examiner—E. R. Kazenske
Assistant Examiner—Paul M. Heyrana, Sr.
Attorney, Agent, or Firm—Senniger, Powers, Leavitt and Roedel

[57] ABSTRACT

Apparatus for cutting elongate workpieces, such as lengths of lumber including lengths of scrap lumber, into blocks of predetermined length for use, for example, as spacers for pallets, the apparatus comprising a chute for holding a workpiece generally vertical comprising separate upper and lower portions, a generally horizontal circular saw blade, a pivotally mounted arm carrying the saw blade for moving the saw blade between a cutting position in which the saw blade extends between the chute portions for cutting the workpiece and a retracted position in which the saw blade is spaced from the chute, and a feed mechanism for feeding the workpiece through the chute under the force of gravity in timed relation to the movement of the arm. The feed mechanism comprises upper and lower clamps for releasably clamping the workpiece in the upper and lower chute portions, respectively, a stop movable between a workpiece supporting position in the lower chute portion for supporting the workpiece with its lower end spaced a predetermined distance below the cutting plane and a block releasing position in which the stop is spaced from the chute to allow a block cut from the workpiece to drop from the chute, and control mechanisms operatively associated with the arm and the upper and lower clamps and the stop for controlling the operation of these latter elements in timed relation to the movement of the arm.

14 Claims, 11 Drawing Figures

APPARATUS FOR CUTTING LENGTHS OF LUMBER INTO BLOCKS

BACKGROUND OF THE INVENTION

This invention relates to cutting apparatus, and more particularly apparatus for automatically cutting relatively long workpieces, such as lengths of lumber, into blocks of predetermined length.

This invention involves an improvement upon cutting apparatus of the type such as shown for example in U.S. Pat. Nos. 3,291,168 and 3,888,151 in which relatively long lengths of lumber are fed under the force of gravity through a plurality of chutes on a turntable, the turntable moving the chutes through a series of operating stations including a cutting station at which a saw blade cuts the workpiece in a horizontal cutting plane into blocks of predetermined length. The prior art cutting apparatus thus is relatively complex in both its structure and its principle of operation, and hence is relatively expensive to build and difficult to operate. Moreover, adjustments of this apparatus for cutting lengths of lumber of different cross sectional sizes, and for cutting the lumber into blocks of different predetermined lengths are difficult, time-consuming operations.

SUMMARY OF THE INVENTION

Among the several objects of the invention may be noted the provision of improved apparatus for cutting lengths of lumber into blocks which is far less complex in both its structure and its principle of operation than prior art cutting apparatus and thus is more economical to build and easier to operate than the prior art cutting apparatus; the provision of such cutting apparatus which requires only a single operator to both feed the workpieces to be cut into the apparatus and supervise the operation of the machine; the provision of such cutting apparatus which readily and quickly may be adjusted to cut workpieces of different cross sectional areas; and the provision of such cutting apparatus which readily and quickly may be adjusted to cut the workpieces into blocks of different predetermined lengths.

In general, the apparatus of this invention comprises a chute for holding an elongate workpiece to be cut generally vertical comprising separate upper and lower portions, the top of the lower chute portion being spaced below the bottom of the upper chute portion to form a gap therebetween, cutting means adapted to cut the workpiece in a generally horizontal cutting plane, and means for moving the cutting means between a cutting position in which it extends into said gap between the chute portions for cutting the workpiece and a retracted position in which it is spaced from the chute. Feed means feeds the workpiece through the chute under the force of gravity in timed relation to the movement of the cutting means between its cutting and retracted positions. The feed means comprises upper and lower clamp means for releasably clamping the workpiece in the upper and lower chute portions, respectively, and stop means movable between a workpiece supporting position in which it extends at least partially across the lower chute for supporting the workpiece with its lower end spaced a predetermined distance below the cutting plane and a block releasing position in which it is spaced from the lower chute position to enable a block cut from the workpiece to drop from the chute. Control means for the upper and lower clamp means and the stop means actuates the upper and lower clamp means to clamp the workpiece in the upper and lower chute portions, respectively, when the cutting means is moved from its retracted to its cutting position. The control means further actuates the upper clamp to clamp the workpiece in the upper chute portion, the lower clamp means to release the block cut from the workpiece, and positions the stop means in its block releasing position to allow the block to drop from the chute when the cutting of the workpiece has been completed. In addition, the control means positions the stop means in its workpiece supporting position and actuates the upper and lower clamp means to release the workpiece to allow it to drop into bearing engagement with the stop means for being supported for the next cutting operation when the cutting means is in its retracted position.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Referring to the drawings, there is generally indicated at 1 apparatus of this invention for cutting elongate workpieces, designated W, such as lengths of lumber including lengths of scrap lumber, into blocks, designated B, of predetermined length for use, for example, as spacers for pallets. The cutting apparatus comprises a frame 3 of generally square outline as viewed from above having upper and lower side frame members 5, 7 of suitable material such as steel channel and legs 9 at each corner of the frame of suitable material such as steel angle. Secured to one side 11 of the frame at the inner faces of the frame members 5, 7 is a chute 13 for holding a workpiece W generally vertical. Cutting means comprising a circular saw blade 17 rotated about a vertical axis by an electric motor 19 via a conventional pulley and V-belt arrangement 21 cuts the workpiece W in a generally horizontal cutting plane. Means, generally indicated at 23, moves the saw blade 15 between an extended or cutting position in which it cuts the workpiece W held in the chute 13 and a retracted position in which it is spaced from the chute. Feed means, generally indicated at 25, feeds the workpiece W through the chute 13 under the force of gravity in timed relation to the movement of the cutting means 15 between its cutting and retracted positions, with the workpiece W releasably clamped in the chute with its lower end 27 spaced a predetermined distance below the cutting plane for enabling the saw blade 17 to cut the workpiece into blocks B of the stated predetermined length.

Figure 1:
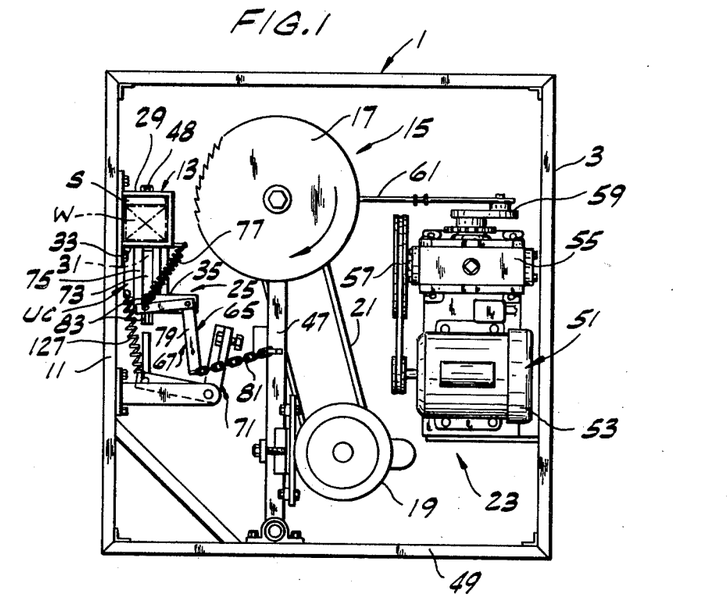
FIG. 1 is a top plan of a first embodiment of cutting apparatus of this invention showing a chute holding a workpiece to be cut and a saw blade spaced from the chute.
Figure 2:
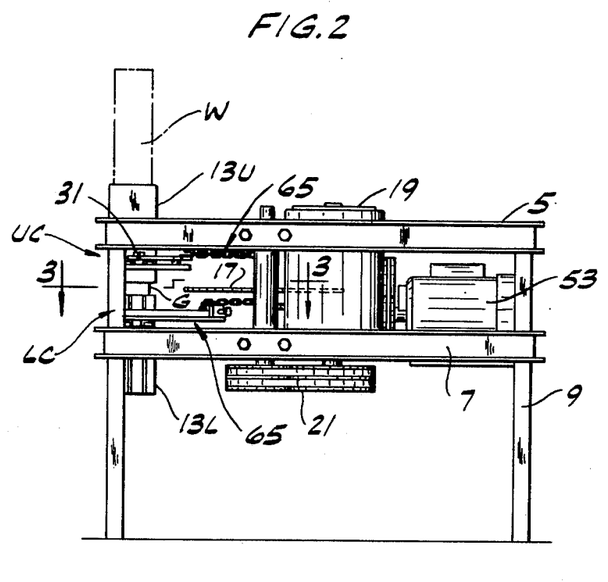
FIG. 2 is a side elevation of FIG. 1 showing upper and lower clamp means on the chute for releasably clamping the workpiece in the chute.
Figure 4:
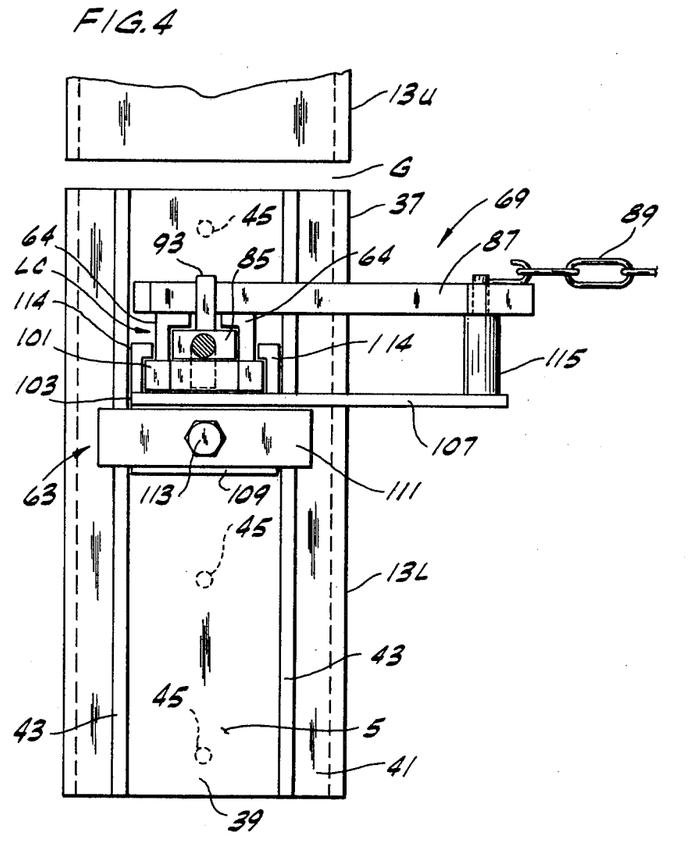
FIG. 4 is a vertical section on line 4—4 of FIG. 3.

As best illustrated in FIGS. 2 and 4, the chute comprises separate upper and lower portions 13U, 13L, the top of the lower portion 13L being spaced below the bottom of the upper portion 13U for forming a gap G in the chute through which the saw blade 17 moves for cutting the workpiece. The upper chute portion 13U comprises a length of generally square section tube having an opening 31 in a side 33 thereof and an L-shaped support 35, see FIG. 1, extending laterally from the side 33 of the tube with its upper surface generally flush with the bottom of the opening 31. The lower chute portion 13L comprises a tube 37 of generally square section having a slot 39 in a side 41 thereof extending from the top to the bottom of the tube, and a pair of laterally outwardly extending lips 43 secured to the tube along the edge margins of the slot 39. Both the upper and lower chute portions 13U, 13L have holes 45 in the sides thereof opposite the sides 33, 41 adapted to receive screws 48 for removably securing a pair of shims S in the chute, the shims being of a thickness such that the distance between the shims and the sides 33, 41 of the upper and lower chute portions is slightly greater than the thickness of the workpiece to be cut. By changing the shims S in the chute workpieces of different thicknesses and cross sectional shapes may be fed through the chute 13 for being cut into blocks B.

The means 23 for moving the saw blade 17 comprises an arm 47 pivotally mounted at an end thereof on a side 49 of the frame the arm being pivotable about a vertical axis, extending generally horizontally across the frame and terminating in a free end adjacent the chute 13, and means, designated 51 for pivoting the arm. The saw blade 17 is mounted for rotation on the arm 47 at the free end thereof, and the electric motor 19 for driving the saw blade is mounted on the arm intermediate its ends. The means 51 for pivoting the arm comprises an electric motor 53 and a gear reduction unit 55 driven by the electric motor via a conventional pulley and V-belt arrangement 57. The gear reduction unit has a crank 59 on its output shaft. A link 61, pin-connected at its ends to the crank 59 and to the arm 47 adjacent its free end, pivots the arm as the output shaft of the gear reduction unit 55 and thus the crank 59 rotate. The link 61 is adjustable in length for enabling adjustment of the limits of travel of the arm 47 and thus the cutting and retracted positions of the saw blade relative to the chute 13.

The feed means 25 comprises upper and lower clamp means UC and LC for releasably holding the workpiece W in the upper and lower chute portions 13U, 13L, respectively. It further comprises stop means 63, see FIGS. 3 and 4, movable between a workpiece supporting position in which it extends at least partially across the lower chute portion for supporting the workpiece at its lower end 27, see FIGS. 5 and 8, and a block releasing portion in which it is spaced from the chute 13 to enable a block B cut from the workpiece to drop from the chute, see FIG. 7. Control means 65 comprising first, second and third control linkages 67, 69, 71 connected to the arm 47 and to the upper clamp means UC, the lower clamp means LC and the stop means 63, respectively, actuates these elements in timed relation to the movement of the arm 47, and hence allows the upper clamp means, the lower clamp means and the stop means to move separately or independently of each other, i.e., each being adjustable in timing one relative to the other as will be further described below.

The upper clamp means UC comprises a plunger 73 of generally rectangular section slidably mounted on the upper surface of the support 35. A pair of angles 75, each mounted on the side edge of one leg thereof on the support 35, guide the plunger for movement laterally with respect to the chute, with the longitudinal axis of the plunger in alignment with the opening 31 in the chute. A tension spring 77 connected at its ends to the upper chute portion 13U and to the plunger 73 biases the plunger into engagement with the workpiece W for clamping the workpiece in the upper chute portion 13U.

The first or upper control linkage 67 (FIG. 1) comprises a bell crank 79 mounted on the support 35 for pivotal movement about a generally vertical axis, and a flexible tension member, such as a length of chain 81, secured at its ends to one arm of the bell crank 79 and to the arm 47 carrying the saw blade 17. The other arm of the bell crank extends between a pair of spaced apart lugs 83 on the plunger. When the arm 47 moves the saw blade to its retracted position thereby drawing the chain 81 taut, the bell crank moves the plunger outwardly away from the chute 13 against the bias of the spring 77 and thus out of engagement with the workpiece W to release the workpiece. By adjusting the length of the chain 81, the relation between the actuation of the plunger 73 and the position of the arm 47 may be adjusted.

Figure 3:
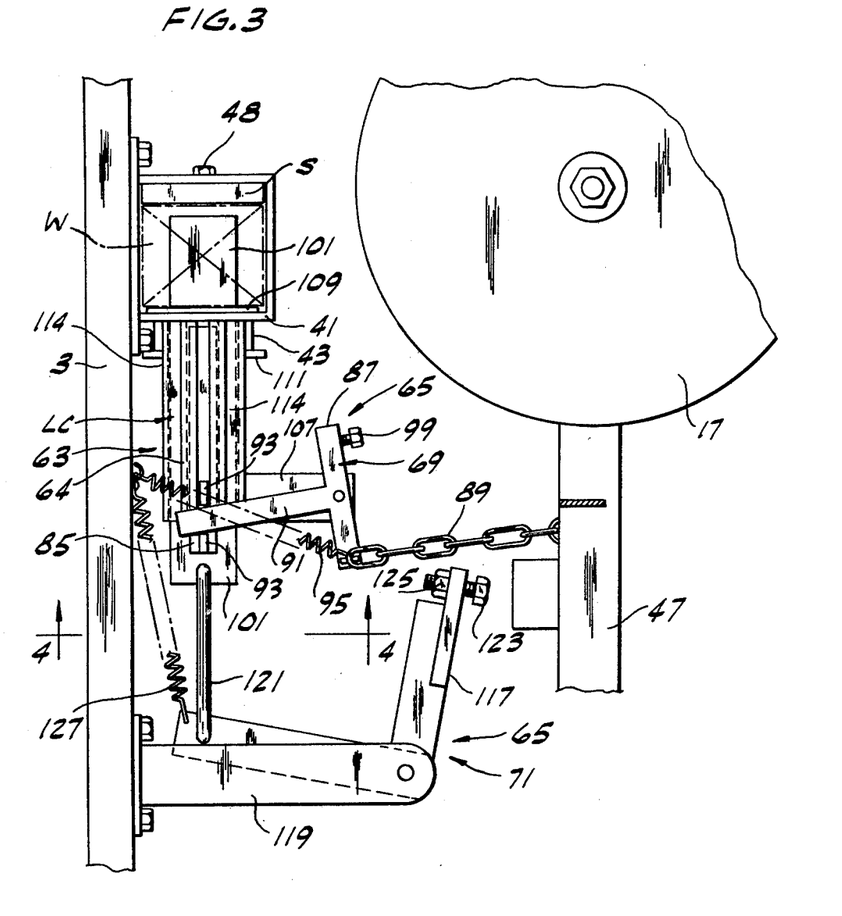
FIG. 3 is an enlarged horizontal section on line 3—3 of FIG. 2 showing the lower clamp means and stop means extending across the chute.

As best illustrated in FIGS. 3 and 4, the lower clamp means LC comprises a plunger 85 similar to that of the upper clamp means, slidably mounted on the upper surface of the stop means 63 and guided for movement laterally with respect to the chute 13 by a pair of angles 64, each mounted on a side edge of one leg thereof on the stop means with the longitudinal axis of the plunger being in alignment with the slot 39 in the lower chute portion. The second or lower control linkage 69 comprises a T-shaped crank 87 mounted on the stop means for pivotal movement about a generally vertical axis extending through the crosshead of the crank generally at the center thereof, and a flexible tension member, such as a length of chain 89, detachably secured at its ends to one end of the crosshead of the crank and to the arm 47. The stem 91 of the crank extends between a pair of spaced apart lugs 93 on the plunger for enabling the crank to move the plunger when pivoted. A tension spring 95 connected at its ends to the stated one arm of the crosshead of the crank 87 and to the frame 3 biases the plunger 85 into engagement with the workpiece. The other end of the crosshead has a screw 99 threaded therein, the head of the screw being engageable by the arm 47 when the arm moves the cutting means to its cutting position. The arm 47 thus pivots the crank 87 against the bias of the spring 95 to move the plunger 85 out of engagement with the workpiece when the arm holds the saw blade 17 in either its cutting or its retracted positions. By adjusting the length of the chain 89 and the position of the head of the screw 99, the relation between the actuation of the plunger 85 and the position of the arm 47 may be adjusted.

The stop means 63 comprises an elongate stop member 101 of generally rectangular section and means 103 for mounting the stop member on the lower chute portion 13L for movement laterally with respect to the chute, with the longitudinal axis of the stop member 101 in alignment with the slot 39 in the lower chute portion. The mounting means 103 comprises an L-shaped support 107 having a flange 109 at its inner end in the lower chute portion 13L spanning the slot 39, a clamping bar 111 spanning the lips 43 at the outer edges thereof and a screw 113 extending through a hole in the clamping bar 111 and threaded in a hole in the flange 109. This clamping arrangement enables adjustment of the vertical position of the stop member 101 and thus the length of the blocks B to be cut. The support 107 has a pair of angles 114, each mounted on the side edge of one leg thereof on the upper surface of one leg of the support, for guiding the movement of the stop member 101 and a pivot pin 115 about which the crank 87 pivots on its other leg.

The third control linkage 71 comprises a bell crank 117 pivotally mounted on a support arm 119 secured to the frame 3. One arm of the bell crank is connected to the stop member 101 by a rod 121 and the other arm has a bolt 123 threaded in a nut 125 secured as by welding to the crank arm, the head of the bolt being engageable by the arm 47 carrying the saw blade. A tension spring 127 connected at its ends to the stated one arm of the bell crank 117 and to the frame 3 biases the stop member in its workpiece supporting position. The arm 47 engages the head of the bolt 123 when the arm moves the saw blade to its cutting position for pivoting the bell crank 117 against the bias of the spring and thus moving the stop member 101 away from the chute toward its block releasing position. By adjusting the position of the head of the bolt 123, the relation between the actuation of the stop member 101 and the position of the arm 47 may be adjusted.

Figure 5:
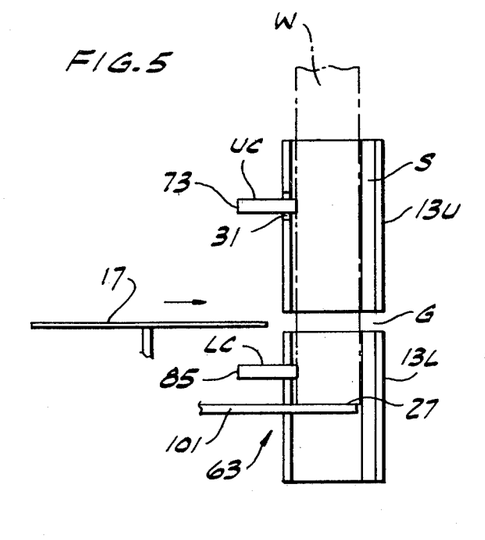
FIG. 5 is a diagrammatic view of the apparatus showing the upper and lower clamp means clamping the workpiece in the chute, the saw blade spaced from the chute, and the stop means extending in the chute.
Figure 6:
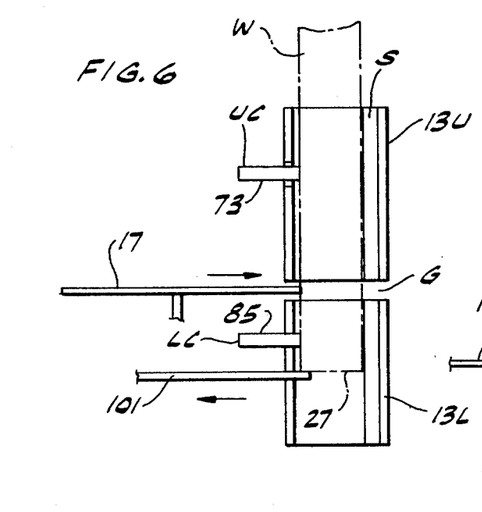
FIG. 6 is a view similar to FIG. 5 but with the saw blade moved toward cutting position and the stop means partially withdrawn from the chute.
Figure 7:
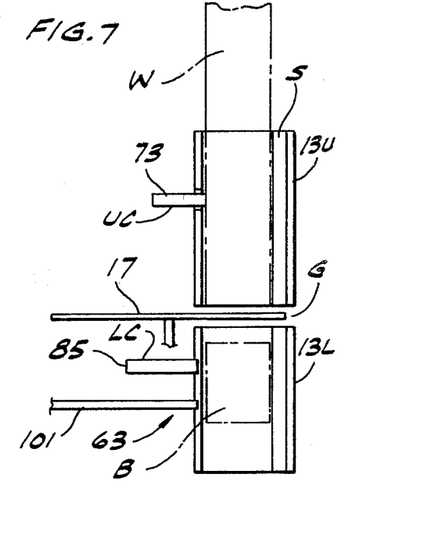
FIG. 7 is a view similar to FIG. 6 but with the saw blade advanced to cutting position to cut a block from the workpiece, the lower clamp spaced from the block, and the stop means in retracted position.
Figure 8:
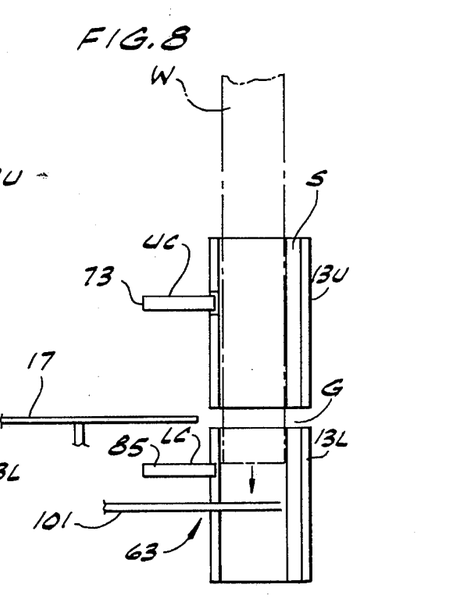
FIG. 8 is a view similar to FIG. 7 but with the saw blade moved to a retracted position, the upper and lower clamp means spaced from the workpiece and the stop means extending into the chute.

As illustrated schematically in FIGS. 5-8, the operation of the cutting apparatus 1 is as follows:

With the arm 47 moving the saw blade 17 from its retracted position toward cutting position, as shown in FIG. 5, the upper and lower plungers 73, 85 are biased into engagement with the workpiece for clamping it in the chute 13 and the stop member 101 extends beneath the workpiece in its workpiece supporting position. As the arm moves the saw blade closer to its cutting position, as shown in FIG. 6, the arm 47 engages the bolt 123 on the bell crank 117 thereby causing the stop member 101 to move toward its block releasing position. With the saw blade in its cutting position, as shown in FIG. 7, the arm 47 engages the screw 99 on the T-shaped crank 87 for moving the lower plunger 85 out of engagement with the workpiece. The block B cut from the workpiece is then free to drop past the stop member 101 and out of the chute, the block B being carried away from the cutting apparatus by a conveyor (not shown) beneath the chute. The upper plunger 73, however, remains biased into engagement with the workpiece for clamping it in the chute and thus preventing against the workpiece bearing on the saw blade 17 which could damage the saw blade. As shown in FIG. 8, when the arm 47 moves the saw blade from its cutting position back toward its retracted position, the arm moves out of engagement with the bell crank 117 for allowing the stop member to return to its normally biased workpiece supporting position, and thereafter pivots the cranks 79, 87 via the chains 81, 89 for moving both the upper and lower plungers 73, 85 laterally outwardly from the chute to allow the workpiece to drop within the chute into engagement with the stop member 101 with the lower end 27 of the workpiece supported at the stated predetermined distance below the cutting plane. As the arm 47 begins to move the saw blade through the next cutting cycle (i.e., from its retracted to its cutting position), the upper and lower plungers 73, 85 return to their normally biased positions in which they engage the workpiece for holding it clamped in the chute, as shown in FIG. 5.

Figures 9, 11:
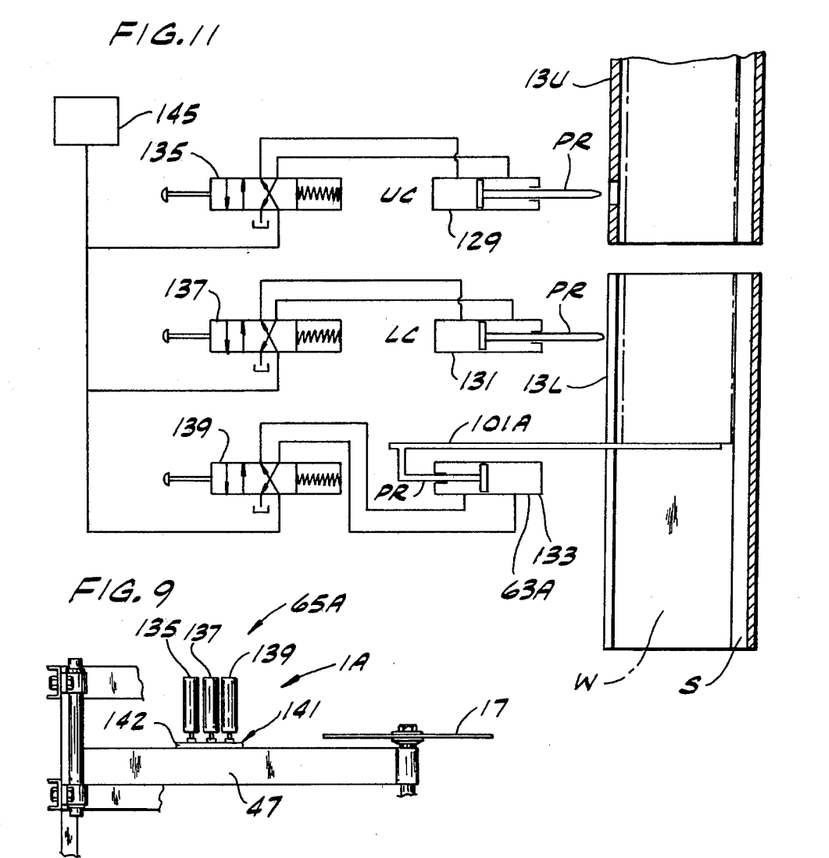
FIG. 9 is a partial side elevation of a second embodiment of the cutting apparatus showing a series of three valves forming part of the feed means of this embodiment.
FIG. 11 is a circuit diagram of the feed means of the second embodiment of the apparatus.
Figure 10:
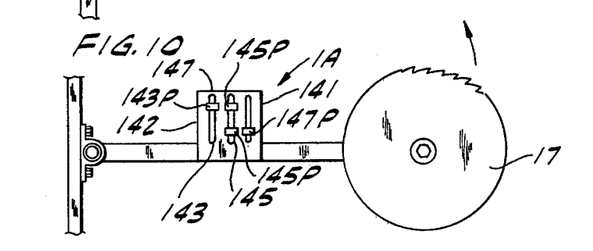
FIG. 10 is a top plan of FIG. 9 with the valves removed to show linear cams for actuating the valves.

Referring to FIGS. 9-11, there is generally indicated at 1A a second embodiment of the cutting apparatus of this invention which is similar to the above-described embodiment 1 except that its upper and lower clamp means UC, LC, stop means 63A, and control means 65A are actuated by fluid under pressure, such as compressed air, in lieu of being mechanically actuated. More particularly, the upper and lower clamp means UC, LC comprise cylinder units 129, 131 mounted at a side of the upper and lower chute portions, respectively, with the rod end of each unit being adjacent the respective chute portion and the longitudinal axis of the unit extending laterally with respect to the chute. The piston rod PR of each unit thus is movable laterally toward and away from the workpiece W. The stop means 63A comprises a cylinder unit 133 mounted adjacent the chute with its head end toward the chute and its piston rod PR extending laterally with respect to the chute. The stop member 101A is secured and extends parallel to the piston rod of the cylinder unit 133. The control means 65A comprises first, second, and third valves (135, 137, 139, respectively) mounted above the arm 47 for supplying air under pressure to the cylinder units, and camming means 141 for operating the valves in timed relation to the movement of the arm 47. The camming means comprises a plate 142 secured to the arm having first, second and third linear cams 143, 145, and 147, respectively, the first cam 143 having a projection 143P at an end thereof toward one end of the plate 142, the second cam 145 having projections 145P at both ends thereof, and the third cam 147 having a projection 147P at an end thereof toward the other end of the plate. Each projection is detachably mounted on the plate 142 for enabling adjustment of the relation between the actuation of the valves 135, 137, 139 (and thus the cylinder units 129, 131, 133) and the position of the arm 47.

As illustrated in FIG. 11, the valves 135, 137, 139 comprise two-way spool valves, the spool of each valve being spring biased to a first position and having a plunger engageable with the respective cam projection for moving the spool to its second position. The first valve 135 is connected in a circuit between a source 145 of air under pressure and the first cylinder unit 129. This valve, when in its normally biased first position, supplies air under pressure to the head end of the unit 129 and vents air at the rod end for holding its piston rod PR in engagement with the workpiece and, when moved to its second position, supplies air under pressure to the rod end of the unit 129 and vents air at the head end for moving its piston rod away from the workpiece. The second valve is connected between the source 145 and the second cylinder unit 131 and supplies air under pressure to the head end of the unit for holding the piston rod in engagement with the workpiece when in its normally biased first position, and to the rod end of unit for moving the piston rod out of engagement with the workpiece when in its second position. The third valve 139 is connected in a circuit between the source 145 and the third cylinder unit 133 and supplies air under pressure to the rod end of the unit for holding the stop member 101A in its workpiece supporting position, when the valve is in its normally biased first position, and to the head end of unit for moving the stop member to its block releasing position, when the valve is in its second position.

In the operation of the second embodiment 1A of the cutting apparatus, with the arm moving the saw blade from its retracted toward its cutting position as shown in FIG. 10, the valves 135, 137, 139 are all in their normally biased first positions, with the piston rods PR of the upper and lower cylinder units 129, 131 thus engaging the workpiece for holding it clamped in the chute and the stop member 101A held in its workpiece supporting position. When the arm 47 moves the saw blade to its cutting position, the projections 145P, 147P adjacent one end of the plate move the second and third valves 137, 139 to their second positions thereby moving the piston rod of the lower cylinder unit 131 out of engagement with the workpiece and the stop member 101A to its block releasing position to allow the block B cut from the workpiece to drop from the chute. The first valve 135 remains in its normally biased first position for holding the piston rod of the upper cylinder unit 129 in engagement with the remainder of the workpiece to clamp it in the upper clamp portion 13U. As the arm moves the saw blade from its cutting position toward its retracted position, the second and third valves 129, 131 return to their normally biased first positions, thereby moving the stop member 101A back to its workpiece supporting position. With the saw blade in its retracted position, the projections 143P, 145P toward the other end of the plate 142 move the first and second valves 135, 137 to their second positions thereby moving the piston rods of the upper and lower cylinder units 129, 131 out of engagement with the workpiece to allow it to drop into engagement with the stop member 101A for the next cutting operation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for cutting elongate workpieces, such as lengths of lumber, into blocks of predetermined length, said apparatus comprising:

a chute for holding a workpiece generally vertical comprising separate upper and lower portions, the top of the lower chute portion being spaced below the bottom of the upper chute portion to form a gap therebetween;

cutting means adapted to cut the workpiece in a generally horizontal cutting plane;

means for moving the cutting means between a cutting position in which it extends into said gap between the chute positions for cutting the workpiece and a retracted position in which it is spaced from said gap between the chute portions; said means for moving the cutting means comprising an arm mounted for pivotal movement about a generally vertical axis, the arm carrying the cutting means adjacent the free end thereof, and means for pivoting the arm and means for feeding the workpiece through the chute under the force of gravity in timed relation to the movement of the cutting means between its cutting and retracted positions, the feed means comprising:

upper and lower clamp means for releasably clamping the workpiece in the upper and lower chute portions, respectively, said upper and lower clamp means being adapted for movement independently of each other, stop means movable between a workpiece supporting position in which it extends at least partially across the lower chute portion for supporting the workpiece with its lower end spaced a predetermined distance below the cutting plane and a block releasing position in which it is spaced from the lower chute portion to enable a block cut from the workpiece to drop from the chute, said stop means being adapted for movement independently of the upper and lower clamp means, and means for controlling the operation of the upper and lower clamp means and the stop means, the control means being associated with said arm, the control means being operable to actuate the upper and lower clamp means to clamp the workpiece in the upper and lower chute portions, respectively, when the cutting means is moved from its retracted to its cutting position; to actuate the upper clamp means to clamp the workpiece in the upper chute portion, to position the stop means in its block releasing position, and to actuate the lower clamp means to release the block cut from the workpiece and allow the block to drop from the chute when the cutting of the workpiece has been completed; and to position the stop means in its workpiece supporting position, and to actuate the upper and lower clamp means to release the workpiece to allow it to drop into bearing engagement with the stop means for being supported for the next cutting operation when the cutting means is in its retracted position.

2. Apparatus as set forth in claim 1 wherein the cutting means comprises a circular saw blade rotatable about a generally vertical axis and means for rotating the saw blade.

3. Apparatus as set forth in claim 1 wherein each of said clamp means comprises a plunger mounted for movement laterally with respect to the chute toward and away from the workpiece in the chute.

4. Apparatus as set forth in claim 3 wherein each clamp means comprises means for biasing the respective plunger into engagement with the workpiece.

5. Apparatus as set forth in claim 4 wherein the stop means is mounted for movement laterally with respect to the lower chute portion.

6. Apparatus as set forth in claim 5 wherein the stop means comprises means biasing it to its workpiece supporting position.

7. Apparatus as set forth in claim 6 wherein the control means comprises a first control linkage, constituting an upper control linkage, connected to the plunger of the upper clamp means and to the means for moving the cutting means, the linkage being operable to move the plunger out of engagement with the workpiece when the cutting means is moved to its retracted position.

8. Apparatus as set forth in claim 7 wherein the upper control linkage comprises a bell crank mounted for pivotal movement about a generally vertical axis and a flexible tension member secured at one end thereof to one arm of the crank and at the other end thereof to the means for moving the cutting means, the other arm of the crank being connected to the upper clamp means.

9. Apparatus as set forth in claim 6 wherein the control means further comprises a second control linkage, constituting a lower control linkage, connected to the plunger of the lower clamp means and the means for moving the cutting means, the lower control linkage being operable to move the plunger out of engagement with the workpiece when the cutting means is moved to its retracted position and again when it is moved to its cutting position.

10. Apparatus as set forth in claim 9 wherein the lower control linkage comprises a T-shaped crank mounted for pivotal movement about a vertical axis and a flexible tension member secured at one end thereof to an end of the crosshead of the crank and at the other end thereof to the means for moving the cutting means, the crosshead of the crank at its other end being engageable by the means for moving the cutting means when the cutting means is in its cutting position, the stem of the crank being connected to the lower clamp means.

11. Apparatus as set forth in claim 6 wherein the control means further comprises a third control linkage connected to the stop means, the third control linkage being operable to move the stop means from its normally biased workpiece supporting position to its block releasing position when the cutting means is in its retracted position.

12. Apparatus as set forth in claim 11 wherein the third control linkage comprises a bell crank mounted for pivotal movement about a generally vertical axis, one arm of the crank being connected to the stop means and the other arm of the crank being engageable by the means for moving the cutting means when the cutting means is in its cutting position.

13. Apparatus as set forth in claim 1 wherein the upper clamp means, the lower clamp means and the stop means comprise first, second and third cylinder units respectively, and the control means comprises a source of fluid under pressure, a first valve in a circuit between said source and said first cylinder unit, the first valve being movable between a normally biased first position in which it supplies fluid under pressure to the first cylinder unit for holding the upper clamp means in engagement with the workpiece and a second position in which it supplies fluid under pressure to the first cylinder unit to move the upper clamp means out of engagement with the workpiece, a second valve in a circuit between said source and the second cylinder unit, the second valve being movable between a normally biased first position in which it supplies fluid under pressure to the second cylinder unit for holding the lower clamp means in engagement with the workpiece and a second position in which it supplies fluid under pressure to the second cylinder unit to move the lower clamp means out of engagement with the workpiece, a third valve in a circuit between said source and the third cylinder unit, the third valve being movable between a normally biased first position in which it supplies fluid under pressure to the third cylinder unit to position the stop means in its workpiece supporting position and a second position in which it supplies fluid under pressure to the third cylinder to position the stop means in its workpiece releasing position, and camming means for selectively moving the valves between their first and second positions.

14. Apparatus as set forth in claim 13 wherein each of said valves has a plunger operable to move the valve from its first to its second position, and said camming means comprises cams carried on the means for moving the cutting means engageable with the plungers of the valves for moving the valves between their first and second positions.

* * * * *